Nov. 8, 1966  M. E. WOOD  3,284,018
SPINNING REEL
Original Filed Nov. 28, 1961  3 Sheets-Sheet 1
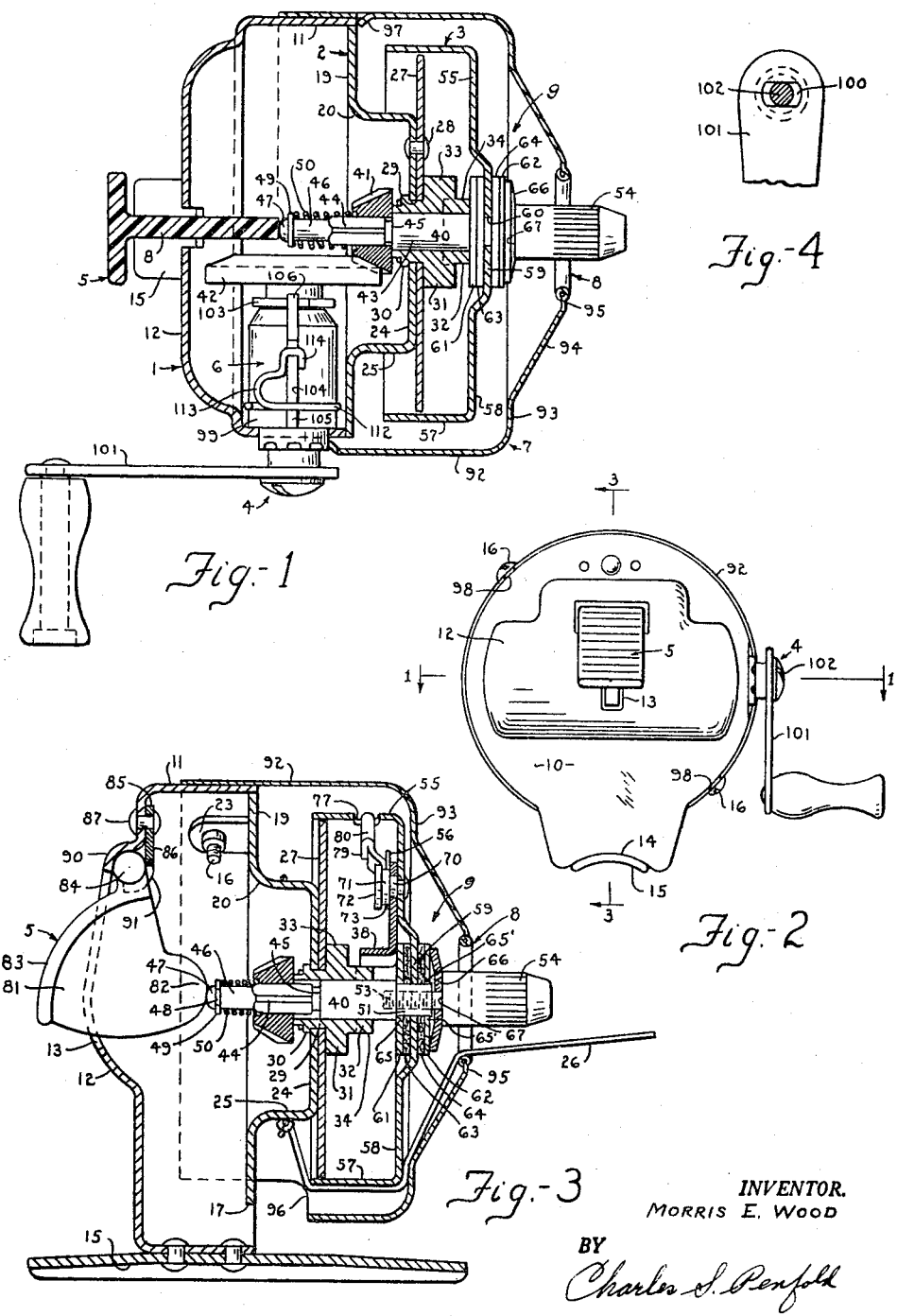
INVENTOR.
MORRIS E. WOOD
BY Charles S. Penfold
ATTORNEY Nov. 8, 1966  M. E. WOOD  3,284,018
SPINNING REEL Original Filed Nov. 28, 1961  3 Sheets-Sheet 2

INVENTOR.
MORRIS E. WOOD
BY Charles S. Penfold
ATTORNEY

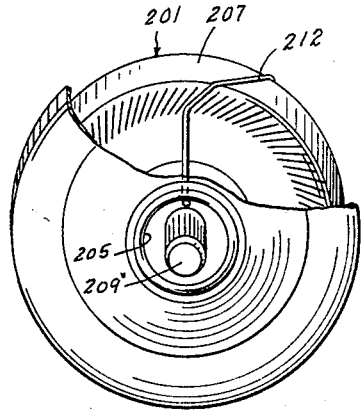
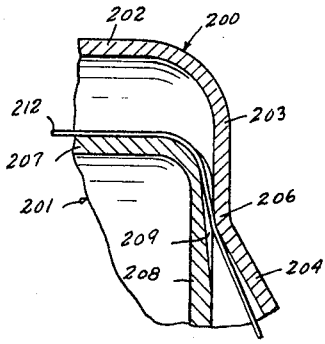
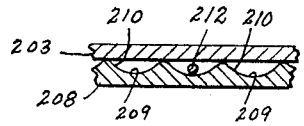
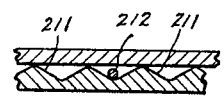
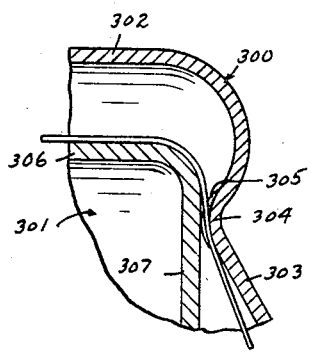
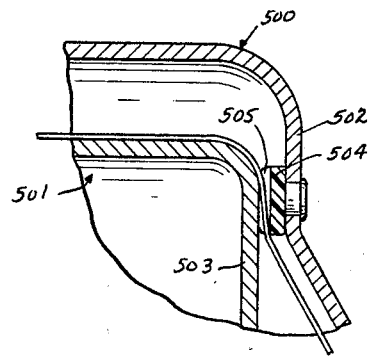
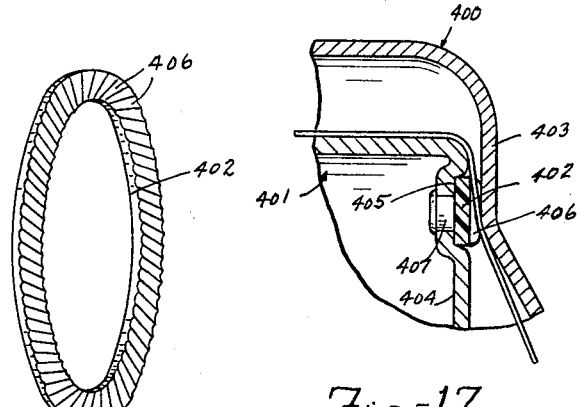

United States Patent Office 3,284,018
Patented Nov. 8, 1966

3,284,018
SPINNING REEL
Morris E. Wood, Bronson, Mich., assignor to Bronson Specialties, Incorporated, Bronson, Mich., a corporation of Michigan
Original application Nov. 28, 1961, Ser. No. 157,039, now Patent No. 3,123,318, dated Mar. 3, 1964. Divided and this application Apr. 26, 1965, Ser. No. 450,782
18 Claims. (Cl. 242—84.2)

This application is a division of application Serial No. 157,039, now Patent No. 3,123,318, and a continuation-in-part of Serial Nos. 853,377 and 257,358, both of which are now abandoned.

The subject invention relates generally to fishing reels and more particularly is directed to improvements in a reel of the spinning type.

One of the important objects of the invention is to provide a reel of the above type with a unique arrangement whereby an improved drag or retarding force of any desired magnitude may be applied to a line pickup assembly through the agency of a control which extends through a line guide opening provided in the end of a cover to facilitate manual operation of the control.

A particular object of the invention is to provide a reel in which the line is controlled in a manner whereby line twist is substantially eliminated.

A particularly important object of the invention is to provide an improved system of line control which serves to prolong the life of a line. Otherwise expressed, the line control serves to prevent appreciable damage or injury to a line.

Other objects of the invention reside in providing a reel which offers distinct advantages with respect to design and construction, cost of manufacture and assembly on a production basis, efficiency in operation and durability.

Additional objects and advantages of the invention will readily become apparent after the description hereinafter set forth is considered in conjunction with the drawings annexed hereto in which a preferred form of the structure embodying the invention is clearly exemplified.

In the drawings:

FIGURE 1 is a horizontal section of the reel taken substantially on line 1—1 of FIGURE 2;

FIGURE 2 is a rear elevational view of the reel;

FIGURE 3 is a vertical section taken substantially on line 3—3 of FIGURE 2;

FIGURE 4 is a transverse section taken through a drive shaft showing the mode of attaching a crank thereto;

FIGURE 11 is a perspective view of a part of a pickup assembly and a cover therefor with a portion of the latter being removed to illustrate certain structural characteristics of the pickup assembly;

FIGURE 12 is an enlarged partial sectional view showing a line interposed between a drum of the pickup assembly and a cover for control thereby;

FIGURES 13 and 14 illustrate various forms of receiving means provided on a portion of a drum of the pickup assembly;

FIGURE 15 is an enlarged partial section of a modified form of a line control in which the receiving means are provided in a portion of a cover as distinguished from being provided on a drum of a pickup assembly;

FIGURE 16 is a pictorial view of an annular element provided with receiving means;

Figure 5:
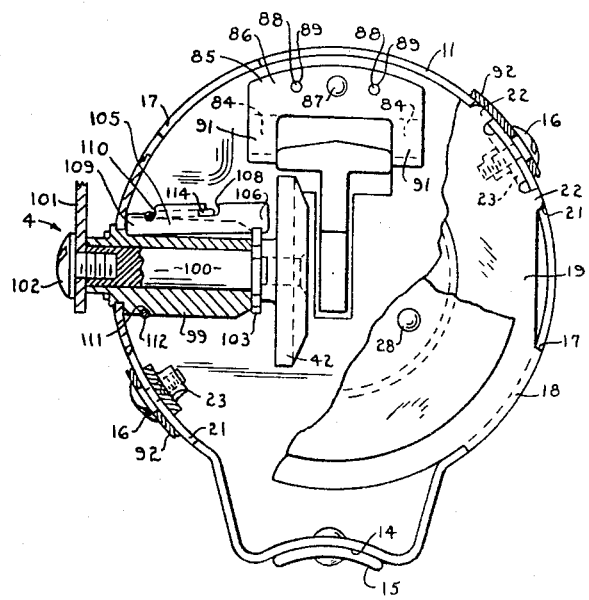
FIGURE 5 is a front elevational view of the reel with portions in section to illustrate details of the structure.
Figure 7:
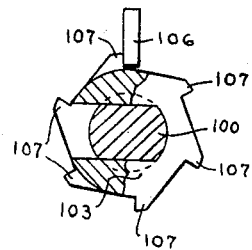
FIGURE 7 is an enlarged partial sectional view of the ratchet mechanism.
Figure 8:
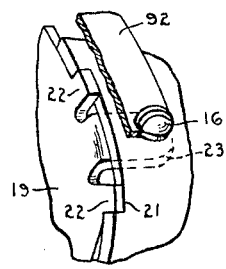
FIGURE 8 is an enlarged partial perspective view showing the mode of attaching the cover, frame and line support of the reel together.

FIGURE 17 is an enlarged partial section showing the element shown in FIGURE 16 as applied to a drum of a pickup assembly for controlling the flow of a line between this element and a cover; and FIGURE 18 is an enlarged partial sectional view showing the element illustrated in FIGURE 16 as applied to a cover for use in controlling the flow of a line between this element and a portion of a drum of a pickup assembly.

Referring more particularly to the drawings, numeral 1 generally designates a frame or housing; 2 a line support or spool; 3 a line pickup assembly for directing a line onto the spool; 4 a driving means for rotating the pickup assembly; 5 an actuator for shifting the pickup assembly forwardly of the spool; 6 a ratchet mechanism; 7 a cover provided with a line guide or opening 8; and 9 a drag or brake assembly operatively associated with the pickup assembly and provided with a handle extending through the opening to facilitate and control adjustment of the brake assembly as desired.

The frame 1, above referred to, is preferably made in the form of a cup having a base wall 10 and a side wall 11. The base wall is preferably pressed outwardly to form a relatively large horizontal bulge or concavo-convex depression 12 provided with a vertical T-shaped opening 13 through which the actuator 5 extends.

The base wall and the side wall are preferably constructed to include a depending hollow radial formation having a lower concave seat 14 in which is secured an elongate plate 15 for attaching the reel to a pole or rod in a conventional manner so that the frame will be supported in a vertical position with its open side facing the end of the pole or rod.

The spool 2 is preferably detachably connected to the frame by screws 16. More specifically in this regard, the free marginal edge of the side wall 11 of the frame is provided with a pair of diametrically disposed seats or notches 17 which receive a pair of offsets 18 extending radially from an annular radial flange 19 of a rear part 20 of the spool. The side wall of the frame is also provided with a pair of notches 21 corresponding to the notches 17 and the flange 19 of the spool is provided with diametrically disposed pairs of offsets 22, which pairs are disposed in the notches 21. The flange 19 is also provided with a pair of axial rearwardly extending lugs 23 which are respectively disposed between the pairs of offsets 22. The screws 16 extend through holes provided therefor in the side wall of the frame and engage threaded apertures provided in the lugs 23 for securing the spool in a fixed balanced condition on the frame, with the rear part 20 of the spool substantially closing off the front open side of the frame. The notches and offsets are preferably arranged so that the spool can be affixed to the frame in either of two positions in order to facilitate their assembly.

The rear part 20 of the spool includes the radial flange 19 above alluded to and a forwardly extending central formation having a base wall 24 and a cylindrical wall 25 for supporting a line 26. The spool comprises the rear part 20 and a front part 27 in the form of a planar plate which is preferably secured in a firm abutting relationship with the base wall 34 of the rear spool part by three rivets 28. It will be noted that the front part of the spool has a diameter which is somewhat less than the diameter of the rear part.

The line pickup assembly 3 and mode of mounting the same for movement with and/or with respect to the spool will now be described. A cylindrical tubular bearing is permanently secured in axially aligned holes provided in the spool parts. This bearing includes a reduced cylindrical portion 29 which extends rearwardly through the aforesaid aligned holes and is upset against the rear face of the base wall 24 of the rear spool part 20 as indicated at 30. The bearing also includes an enlarged cylindrical portion 31 abutting the front spool part 27 and a reduced forwardly extending cylindrical portion 32. The enlarged cylindrical portion is provided with a peripheral bearing surface 33 and the reduced portion with a peripheral bearing surface 34. The enlarged portion is also provided with diametrically disposed interruptions or notches, each of which is defined by a chordal shaped radial surface 35 and an axial surface 36. The axial surfaces 36 are tangent to the peripheral bearing surface 34 of the reduced portion 32 and due to the notches the enlarged cylindrical portion 31 is divided into a pair of portions having diametrically disposed arcuate planar surfaces 37 which are arranged in advance of and in parallel relation to the chordally shaped radial surfaces 35. These various surfaces are adapted for cooperation with a flange 38 formed on a pickup lever 39 constituting a component of the pickup assembly in a manner which will be described more in detail subsequently.

A driven shaft 40 is rotatably and slidably mounted in the tubular bearing and carries a pinion gear 41 which meshes with a drive gear 42 of the driving means 4 for rotating the driven shaft and pinion gear. The shaft is preferably designed and constructed to include a cylindrical portion 43 which is journalled in the bearing, a squared portion 44 having a cross dimension less than the portion 43, a shoulder or abutment 45 disposed between the portions 43 and 44, and an inner reduced cylindrical portion 46 provided with a rounded end 47 and an adjacent transverse annular groove 48. A spring clip or abutment 49 is detachably seated in this groove for holding a helical spring 50 between the clip and pinion gear to cause this gear to normally bear against the shoulder 45 and/or the inner end of the bearing. The pinion gear is provided with a squared aperture for receiving the squared portion 44 of the shaft to slidably key the gear thereon. The helical spring normally surrounds the inner reduced portion 46 and a portion of the squared portion 44 of the shaft, with its fore end seated in a small circular recess provided in the rear face of the pinion gear as shown in FIGURES 1 and 3. With this organization the shaft and pickup assembly carried thereby can be rotated through the agency of the gears and, when desired, can be shifted forwardly by the actuator 5 relative to the spool and pinion gear to carry the pickup assembly in a direction away from the spool.

The driven shaft is also formed with an outer reduced cylindrical tubular portion 51 provided with a pair of parallel longitudinally extending slots 52. The adjacent cylindrical portion 43 of the shaft is provided with an axially extending threaded aperture which receives a threaded portion 53 of a manual control 54. This control is preferably constructed in the form of a knurled handle or knob which extends through the line guide opening 8 to facilitate adjustment of the drag means 9 to regulate the amount of force applied to the line pickup assembly for retarding its rotational movement with respect to the shaft and/or spool to control release of the line from the spool.

Figure 9:
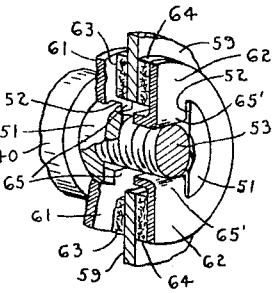
FIGURE 9 is an enlarged perspective view of sections of the drag structure.
Figure 10:
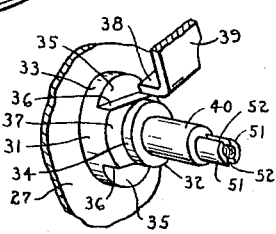
FIGURE 10 is an enlarged perspective view showing the relationship of the pickup lever to various surfaces of the bearing supporting the driven shaft.

The pickup assembly comprises a drum or cup member 55, the pickup lever 39, above referred to, and a spring 56 operatively connected to the lever. The drum includes a cylindrical axial wall 57 and a base wall 58 having a central circular depression 59 provided with a round opening 60 through which the outer reduced portion 51 of the driven shaft extends to permit relative rotation therebetween. A pair of rigid planar friction members 61 and 62 are mounted on and keyed to the driven shaft by means of diametrically opposed projections formed on these members which project into the longitudinal slots 52 in the shaft as shown in FIGURE 9. More particularly, the friction member 61 has radial projections 65 which extend into the slots 52 for keying this member to the shaft and the friction member 62 has axially extending projections 65' which extend into the slots for keying member 62 to the shaft. The member 61 bears against a shoulder formed on the shaft and is preferably made somewhat thicker than the member 62 so that it will withstand axial thrust and impart stability to the pickup assembly. The axial projections on the member 62 insure retention of this member on the shaft so that it will not shift laterally in the event the control 54 is unscrewed to an extent that would otherwise normally release these projections from the slots.

A pair of corresponding resilient planar friction elements 63 and 64 are provided with round holes through which the outer portion 51 of the shaft extends. The friction element 63 is interposed between the member 61 and the depression 59 of the pickup drum. The friction member 62 abuts a dished spring washer 66 backed against a shoulder 67 on the control 54 and the friction element 64 is interposed between the depression and the friction member 62. The depression serves to provide a larger area or space between the front part of the spool and the base wall of the drum to better accommodate the fore part of the bearing, the friction member 61 and the friction element 63, as well as impart rigidity to the drum. With this unique organization, the control 54 which holds the friction members, friction elements, spring washer and the drum in a predetermined assembled relation on the driven shaft can be readily manipulated to cause the friction element to engage and clamp the depression of the drum therebetween to lock the drum for rotation with the shaft or allow the drum to rotate relative to the shaft. In other words, the control can be screwed tightly onto the driven shaft to substantially prevent relative rotational movement between the pickup and driven shaft or loosened to obtain a variable drag action therebetween in order to offer resistance to the outward flow of line through the guide opening 8 from the spool. Attention is directed to the fact that the guide opening is relatively large and formed by spinning a flange over against the inner surface of the cover 7 to provide a convex surface and that the control is of predetermined diameter and length for axial disposition in the opening to facilitate manipulation of the control and provide an annular space about the control to assist in controlling the flow of line to and from the reel.

Figure 6:
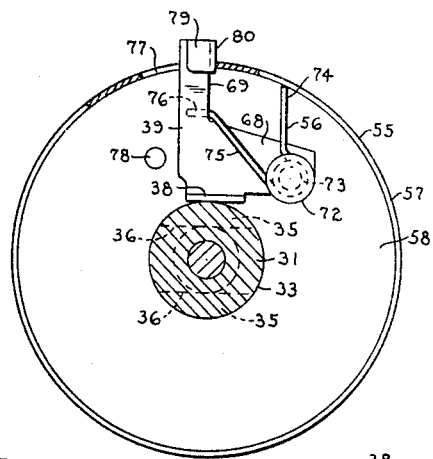
FIGURE 6 is a partial vertical section showing certain details of the line pickup structure.

The pickup lever 39 of the pickup assembly may be designed and constructed in various ways but as exemplified in the drawing includes a leg portion 68 and a leg or finger portion 69 arranged substantially at right angles in an offset relation to the leg portion 68. The leg portion 68 is preferably provided with the flange 38, above referred to, which extends rearwardly at right angles to the plane of the leg 68 as depicted in FIGURES 3 and 6. A stud extends through the base wall 58 of the pickup drum and the outer end of the leg 68 for connecting the lever to the drum for pivotal movement with respect thereto. The stud comprises a portion which is secured in a hole provided therefor in the drum, a cylindrical portion 70, a cylindrical portion 71 and a head portion 72. The lever is provided with an aperture which receives the cylindrical portion 70 of the stud and an annular loop portion 73 of the spring 56 detachably grips the larger cylindrical portion 71 of the stud. The spring also includes a pair of legs 74 and 75 which bear against the rear side of the lever. More specifically in this regard, both of the legs of the spring primarily engage the leg portion 68 of the lever with the free end of the leg portion 74 bearing against the inner surface of the side wall 57 of the pickup drum. The free end of the spring leg 75 overlies an edge of the lever and is provided with an offset 76 which bears against the front side of the lever. The finger portion 69 of the lever is disposed for movement relative to a clearance slot 77 provided therefor in the side wall of the drum as depicted in FIGURE 6. The spring serves to stabilize the relative pivotal positions of the lever and allows the line to freely retract the lever when the pickup assembly is projected forwardly by the actuator as the line flows from the spool. The base wall of the drum is provided with an abutment 78 which may be engaged by the lever to limit its inward pivotal movement and locate the leg 69 in a predetermined position entirely within the confines of the drum when the drum is shifted forwardly. The flange 38 on the lever is adapted to engage the peripheral surface 33 of the bearing when the drum is in a retracted line winding position to maintain the finger portion of the lever projected for directing line onto the spool. The free end of the finger portion 69 is preferably formed with an overlapping portion 79 to provide an elongate convex surface 80 for engaging the line and reducing wear thereon.

In view of the foregoing it will be apparent that the spool, pickup assembly, drag means, and driven shaft are all operatively connected together to constitute a subassembly which can be easily and quickly attached to the frame and cover and that the pickup assembly and drag means also comprise subassemblies.

The actuator generally designated 5 for shifting the driven shaft and pickup assembly thereon axially forward is preferably in the form of a lever and T-shaped in cross-section, as viewed in FIGURES 1, 2 and 5, and includes a planar portion 81 which extends through the T-shaped opening 13 in the enlargement 12 of the frame. This planar portion is provided with a rounded nose or cam portion 82 for engaging the rounded end 47 of the driven shaft as shown in FIGURES 1 and 3. The actuator also includes an arcuate ribbed head portion 83, the major portion of which is exposed for manual engagement by the thumb of the operator.

The upper part of the actuator is provided with a pair of trunnions 84 extending laterally therefrom. A bracket 85 has a planar portion 86 secured against the inner surface of the base wall 10 of the frame above the depression 12 by a rivet 87. In order to stabilize the position of the bracket the wall 10 is preferably distorted forwardly at 88 into small apertures 89 provided therefor in the planar portion 86 on either side of the rivet. The depression or bulge 12 is formed with an upper offset portion 90 which merges with the bulge and the planar portion of the bracket is provided with a pair of longitudinally spaced curved tongues 91 which extends rearwardly toward the offset portion 90 and form in combination therewith a pair of curved means which journal or pivotally receive the trunnions 84. A portion of the actuator is disposed between the tongues to center the actuator in the T-shaped opening 13 so that the actuator may freely swing or gravitate against the rounded end of the driven shaft without engaging the marginal edges of the material defining the opening. Otherwise expressed, the actuator is suspended for free pivotal movement and due to its shape and weight distribution its curved nose or cam portion 82 will normally rest or bear against the driven shaft.

The cover generally designated 7 may be designed and constructed in various ways but as illustrated preferably comprises an axially extending cylindrical wall 92 substantially surrounding the side wall of the frame, an annular radial wall 93 disposed axially opposite the pickup drum 55, a conical portion 94, and an end wall 95 in which the line guide opening 8 is provided. The cylindrical wall 92 telescopically embraces the cylindrical side wall 11 of the frame and is notched at 96 to receive the lower offset portion of the frame. The wall 92 is also provided with a pair of inturned portions 97 (only one is shown in FIGURE 1). The inturned portions constitute stops that limit the extent of the relative sliding of the frame and cover toward one another and at the same time locate a pair of notches 98 in the wall 92 in registry with holes provided therefor in the side wall 11 of the frame so that the screws 16 can be extended through the notches, holes and connect with the threaded apertures provided in the lugs 23 of the spool part 20 for holding the cover and spool in assembled relationship. After these components have once been assembled the screws may be loosened without removal to permit the cover to be slid off the frame to obtain access to the pickup assembly and drag means to facilitate their repair, removal or replacement from the driven shaft, if required.

The driving means generally designated 4 will now be described. A cylindrical tubular bearing 99 has a reduced outer end which extends through an aperture in the side wall of the frame and is upset against the outer surface of this wall to permanently anchor the bearing in place with the major portion of its length extending radially toward the longitudinal axis of the frame.

A drive shaft 100 is journalled in the bearing and its outer end portion is squared and provided with an axial threaded aperture as shown in FIGURE 5. A crank 101 is provided with a squared opening which receives the squared portion of the shaft and a screw 102 engages the threads of the aperture for detachably securing the crank for rotation with the shaft.

The drive gear 42 is fixed on the drive shaft for movement therewith and meshes with the pinion gear 41 for rotating the pickup assembly. A ratchet wheel 103 is preferably fixed or formed on the outer side of the drive gear or shaft and engages the inner end of the bearing for limiting outward movement of the shaft and spacing the gear axially from the bearing as evidenced in FIGURE 5.

The ratchet mechanism includes the ratchet wheel 103 above referred to and will now be described. The drive shaft bearing 99 is provided with an exterior longitudinally extending slot 104 and an elongate planar pawl member 105 is disposed in this slot for rockable or tiltable movement in the plane of the drive shaft. The slot extends throughout the length of the bearing and a portion of the frame (not shown) projects into the slot to prevent rotation of the bearing relative to the frame. The inner end of the pawl is provided with a detent portion 106 for successively engaging preferably six teeth 107 on the ratchet wheel. The pawl is also provided with a notch 108 and a reduced outer end 109 forming a shoulder 110. The bearing is also provided with an exterior transverse groove 111 and a resilient means preferably in the form of a wire spring has an annular portion 112 which is disposed in the annular groove and bears against the reduced end 109 of the pawl and the shoulder 110. The spring also includes an offset loop portion 113 disposed in a plane substantially tangent to its annular portion and the bearing and further includes a hook portion 114 which is disposed in the notch 108 and embraces the pawl as shown in FIGURES 1 and 5. With this setup the pawl is resiliently held in the slot so that its detent portion will be caused to readily engage the teeth on the ratchet member to positively prevent the drive shaft and gear thereon from rotating in a reverse direction. It will be noted that the inner end of the bearing is preferably tapered adjacent the ratchet wheel in order to provide a suitable clearance space for movement of the detent portion of the pawl.

In view of the foregoing it will be manifest that when the pickup assembly is in a normal operating position, with the friction member 61 engaging the end of the reduced portion 32 of the bearing supporting the driven shaft, as exemplified in FIGURES 1 and 6 of the drawing, the line engaging portion 80 of the pickup lever will be extended to catch and direct line onto the spool when the driving means is operated, due to the fact that the inner flange 38 of the lever rides on the peripheral surface 33 of the bearing. The pickup assembly may be readily shifted forwardly to an inoperative position as depicted in FIGURE 3 by manipulating the actuator 5. When the actuator is depressed the driven shaft will slide forwardly relative to its bearing and the pinion gear and compress the helical spring 50. During this forward movement the flange 38 of the lever will first slide axially off the peripheral surface 33 of the enlarged portion 31 of the bearing and then onto the peripheral surface 34 of the reduced portion 32 of the bearing. The flange of the lever is of a predetermined size so that its rear edge will engage either of the radial extending arcuate planar surfaces 37 on the bearing to maintain the pickup assembly in the inoperative position just referred to, in which position the lever is retracted so that its outer line engaging portion or surface 80 is disposed within the confines of the pickup drum as shown in FIGURE 3.

When the pickup assembly is in the inoperative position the drum substantially uncovers the throat or side of the spool so that the line may freely flow or travel therefrom over the cylindrical wall 57 of the drum and out through the guide opening 8. Attention is directed to the fact that the line unwinds about the manual control 54 between the marginal edge of the material defining the opening and the periphery of the control so as to assist in controlling the flow to prevent line twist and entanglement. The outward flow of line may be readily controlled by merely depressing the actuator to shift the driven shaft and pickup assembly forwardly so that the base wall 58 of the drum will force the line against the annular radial wall 93 of the cover 7. With this setup the flow of the line from the spool may be stopped or retarded, as desired, depending on the force applied to the actuator in clamping the line between the walls of the cover and drum. In making a cast the actuator is preferably fully depressed to cause the drum to clamp the line until such time that the line is released by allowing the pickup assembly to move backwardly or return through the action of the spring 50 to a position where the flange 38 on the lever will engage either of the foremost surfaces 37 or either of the surfaces 35, after which the actuator may again be depressed to cause the pickup assembly to travel forwardly to stop or retard the outward flow of the line. Thus, the forward shifting of the pickup assembly renders the latter inoperative insofar as being capable of directing line onto the spool but is effective for line clamping. It will also be manifest that the drag means may be regulated to control relative rotation between the pickup assembly and the driven shaft when a fish is caught to exert an outward pull on the line. In other words, the outward flow of the line can be controlled by varying the pressure applied to the pickup drum to regulate rotation of the pickup assembly with respect to the driven shaft.

The pickup assembly may be readily and quickly automatically returned to its operative line winding position, as shown in FIGURE 1, by merely turning the crank 101 to rotate the pickup assembly so that the rear edge of the flange 38 of the pickup lever will ride off the peripheral surface 34 of the reduced portion 32 and either of the radial surfaces 37 of the bearing onto either of the chordal shaped radial surfaces 35 of the bearing and then gradually back onto the large peripheral surface 33 to the operative position of FIGURE 1, through the action of the contracted helical spring 50. In other words, the flange of the lever falls back onto either of the radial surfaces 35 due to the fact that the axial surfaces 36 of the bearing are tangent to the peripheral surface 34 of the reduced portion 32. One or the other of the axial surfaces 36 serves to engage and cam the flange to gradually pivot the lever so the flange will ride back onto the peripheral surface 33. The chordally shaped surfaces 35, as explained previously, are spaced axially to the rear of the surfaces 37 so that the pickup assembly is actually forced back one step when the flange of the lever engages the chordal surfaces before it is returned to the fully retracted position.

Referring now to the improved line control structures illustrated in FIGURES 11 through 19 and particularly to FIGURES 11 through 14, there is shown in FIGURES 11 and 12 an assembly comprising a stationary cover member generally designated 200 and a drum member generally designated 201 constituting a component of a pickup unit.

The stationary cover member includes a cylindrical wall 202, a front wall having an annular portion 203, and a forwardly extending conical portion 204 provided with a line guide opening 205. It will be observed that the portions 203 and 204 of the front wall of the cover are preferably joined together by an intermediate portion 206 as clearly shown in FIGURE 12.

The drum member 201 of the pickup unit or assembly includes a cylindrical rearwardly extending wall 207 which is disposed in concentric spaced relation to the cylindrical wall 202 of the cover and a front annular wall 208 which is disposed in opposed relation to the front wall of the cover. The drum 201 is carried by a driven shaft and is operatively connected thereto by a manually operable element 209' in a manner substantially corresponding to the structure above referred to, with the element 209' extending through the line guide opening 205. The driven shaft and the drum member 201 are adapted for reciprocation as a unit through the agency of the manual operating means above described.

The improvement involves providing means controlling the line at a location between the cover and pickup members. More specifically in this respect, the front wall 208 of the line pickup drum member is provided with a plurality of circumferentially spaced chordally disposed receiving means 209. The receiving means may be designed and constructed in various ways but, as exemplified in FIGURES 11, 12 and 13, each is preferably made in the form of a groove or channel which is preferably arcuate or curved in cross section, as indicated at 210. If desired, the grooves or channels may be constructed so that they are generally V-shaped in cross section as depicted at 211 in FIGURE 14. The grooves are preferably provided in the front wall 208 adjacent its periphery or in that portion of the wall which is adapted to be brought into engagement with the annular portion 203 and/or portion 206 of the front wall of the cover member 200, as clearly shown in FIGURE 12.

The receiving means or grooves 209 are positioned to generally correspond or match the helical path of a line 212 as it unwinds over the surface of the drum. It is to be observed that the depth of the grooves is somewhat greater than the diameter of the line. When the drum is moved into contact with the front wall of the cover an embracement passage is formed through which the line is free to pass along its axis, parallel with the axis of the grooves. The line moves around the outside diameter of the drum and inwardly across its face as it is removed from the spool. The passages or material defining the same prevent this movement of the line by entrapment or confinement. In this respect, attention is directed to the fact that the side walls or surfaces defining the passages are generally perpendicular to the path of the line and thereby serve to hold the line against outward movement from the reel. When the drum is moved rearwardly away from the cover, the passages or grooves are opened and the line is again free to spiral across the face of the drum and out of the reel.

It is the general practice with closed face spinning reels to clamp, grip or otherwise hold the line between the interior opposed surfaces of the reel structure in order to make a cast. These surfaces are usually parts of the pickup drum and reel cover and provide metal to metal, metal to plastic or plastic to plastic contact to hold the line. Continued clamping of the line in such reels causes the line to be flattened, scuffed or otherwise injured. This damage is generally confined to a relatively short length of line and quickly weakens the line in this area. The path of the line as it is removed from the spool and reel is a helix sliding around the outside diameter of the drum and across its front face. To make a cast, the drum is moved forwardly along the longitudinal axis of the reel into contact with the front wall of the cover. The line is held against movement between contact pressure by the conventional thumb-operated lever or button located in the rear of the reel. The line in such conventional constructions is held against movement in any direction by this pinching or clamping action. The subject invention overcomes the foregoing disadvantages.

Referring to FIGURE 15, there is shown a modified assembly embodying the invention. More particularly, there is shown a stationary cover member generally designated 300 and a pickup drum member generally designated 301. The cover is provided with a cylindrical wall 302, a frontal conical portion 303 and an annular intermediate portion 304. The portion 304 may be termed a re-entrant portion or an abutment means and its inner surface is provided with a plurality of circumferentially spaced chordally shaped receiving means 305 which are preferably in the form of grooves.

The drum member 301 includes a cylindrical wall 306 disposed concentric to the cylindrical wall 302 of the cover member and front annular wall 307 disposed in opposed relation to the front wall of the cover. It will be observed that the structure illustrated in FIGURE 15 is different from that illustrated in FIGURES 11 and 12 by providing the receiving means on the cover in lieu of on the drum.

Referring to FIGURES 16 and 17, there is shown a stationary cover member generally designated 400, a drum member generally designated 401, and an annular element 402. The cover includes an annular frontal wall portion 403 and the drum with a frontal wall 404 having a circumferential peripheral groove 405 therein. The annular element or ring 402 is preferably constructed from plastic and secured in the groove 405. Its frontal surface is provided with a plurality of circumferentially spaced chordally disposed receiving means or grooves 406 for selectively receiving a line for achieving substantially the same objectives as described above in connection with FIGURES 11 through 15. The element 406 may be secured in the groove in any desired manner but as illustrated it is preferably provided with a plurality of three rearwardly extending pins or projections 407 which are preferably extended through holes provided therefor in the base of the material defining a portion of the groove for upsetting as shown.

Referring to FIGURE 18, there is shown a stationary cover member generally designated 500 and a pickup drum member 501. The cover includes an annular frontal portion 502 and the drum 501 with an annular front wall 503. An annular element or ring 504, substantially corresponding to the element illustrated in FIGURE 16, is secured to the front wall 502 of the cover in such a position that when the drum is moved forwardly into engagement with the element, the line will be held in one of a plurality of circumferentialy spaced receiving means or grooves 505 provided in the element.

In view of the foregoing, it will be manifest that the above described line control structures serve to prolong the life of a line, as well as prevent distortion thereof.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. A spinning reel comprising a frame, a fixed bearing, a spool secured to the frame, a driven shaft carried by and reciprocally and rotatably mounted in said bearing, a line pickup assembly carried by the fore end of the shaft for directing the line onto the spool, means for rotating the shaft and pickup assembly, a cover secured to the frame and having an end wall disposed in front of the pickup assembly, said end wall being provided with an opening through which the line may flow to and from the spool, an actuator carried by the frame for rockable movement about an axis disposed transverse to said driven shaft for reciprocating the shaft and pickup assembly forwardly so that the pickup assembly may be caused to force the line against the cover for braking the outward flow of the line, friction-producing means carried by the shaft and engaging the pickup assembly, and control means mounted on the fore end of the shaft coaxially with said opening for digital operation in a manner whereby the friction-producing means may be readily adjusted to control relative rotational movement between the shaft and pickup assembly.

2. The reel defined in claim 1 in which at least a portion of said control means on said shaft extends through said opening whereby to facilitate its manipulation.

3. A spinning reel comprising a frame, a spool disposed in the frame and carrying a fixed bearing, a driven shaft carried by and reciprocally and rotatably mounted in said bearing, a line pickup assembly carried by the fore end of the shaft for directing the line onto the spool, means for rotating the shaft and pickup assembly, a cover mounted on said frame and having an end wall disposed in front of the pickup assembly and provided with an opening through which the line may flow to and from the spool, means for securing said cover, frame and spool in assembled relation, friction-producing means carried by the shaft and engaging the pickup assembly, control means mounted on the fore end of the shaft for digital operation in a manner whereby the friction-producing means may be readily adjusted to control relative rotational movement between the shaft the pickup assembly, and an actuator carried by the frame for reciprocating the driven shaft and pickup assembly thereon forwardly for clamping the line between this assembly and the cover.

4. A spinning reel comprising a frame, a spool secured to said frame and carrying a fixed bearing, a driven shaft reciprocally and rotatively mounted in said bearing, a line pickup assembly including a drum member carried by a fore end of said shaft for directing the line onto said spool, means for rotating said shaft and pickup assembly as a unit, a cover member secured to said frame and having an end wall disposed in front of said pickup assembly, said end wall being provided with an opening through which a line connected to said spool may flow, said members being constructed and arranged whereby to provide a plurality of circumferentially spaced substantially chordally disposed receiving means, an actuator carried by said frame for moving said unit forwardly so that said drum member may be caused to engage said end wall of said cover member and confine the line in at least one of said receiving means for retarding its travel through said opening without pinching said line between said members, friction producing means carried by said driven shaft and engaging said pickup assembly, and control means mounted on the fore end of said shaft coaxially with said opening for digital operation in a manner whereby said friction producing means may be readily adjusted to control relative rotational movement between said shaft and said pickup assembly.

5. A spinning reel comprising a frame, spool disposed in said frame, a fixed bearing, a driven shaft reciprocally and rotatably mounted in said bearing, a line pickup assembly including a drum member carried by the fore end of said shaft for directing the line onto said spool, means for rotating the shaft and pickup assembly as a unit, a stationary member disposed in front of said drum member of said pickup assembly and provided with an opening through which a line may flow to and from the spool when connected to the latter, friction producing means carried by said driven shaft and engaging said pickup assembly, control means mounted on the fore end of the shaft for digital operation in a manner whereby said friction producing means may be readily adjusted to control relative rotational movement between said shaft and pickup assembly, one of said members being provided with a plurality of circumferentially spaced substantially chordally disposed grooves, and an actuator carried by said frame for reciprocating said unit forwardly for causing said drum member to engage said stationary member while allowing the line to be received in one of said receiving means without pinching said line between said members.

6. The spinning reel defined in claim 1, in which said spool carries said fixed bearing.

7. The spinning reel defined in claim 1, in which said line pickup assembly and said cover are provided with means which cooperate with one another to define a plurality of chordally disposed straight passages when the cover and assembly are brought into engagement with one another so that a line may be freely received in any one of said passages.

8. The spinning reel defined in claim 1, in which said friction-producing means is jointly carried by said shaft and said pickup assembly.

9. The spinning reel defined in claim 4, in which said chordally disposed receiving means are provided on said drum member.

10. The spinning reel defined in claim 4, in which said chordally disposed receiving means are provided on said cover member.

11. The reel defined in claim 5, in which said drum member comprises a front wall to which the fore end of the shaft is connected and a cylindrical wall, and said grooves are formed in said front wall at a location adjacent said cylindrical wall.

12. The reel defined in claim 5, in which said grooves are formed in said stationary member in concentric relation to the opening therein.

13. The reel defined in claim 5, in which a separate annular element is affixed to said drum member and the grooves are disposed in said element.

14. The reel defined in claim 5, in which a separate annular element is affixed to said stationary member in concentric relation to the opening therein and the grooves are disposed in said element.

15. A spinning reel comprising a frame, a spool secured to said frame, a fixed bearing, a driven shaft carried by and reciprocably and rotatably mounted in said bearing, a line pickup comprising a frontal member provided with means for directing a line onto said spool, said frontal member having a front wall which is connected to the fore end of said shaft and also having a cylindrical side wall, means for rotating said shaft and pickup, a stationary member secured to said frame in front of said pickup and provided with an opening for receiving a line adapted for connection with said spool, an actuator carried by said frame for moving said pickup forwardly so that said frontal member may be caused to engage said stationary member, means carried by said front wall at a location adjacent its side wall, said last-mentioned means comprising a plurality of longitudinally extending straight ribs defining an annular pattern of chordally disposed grooves, the arrangement being such that a line may be received in any one of said grooves to maintain the line in a substantially straight condition therein without clamping it when the members are brought into engagement.

16. The reel defined in claim 15, in which said means carried by said front wall is in the form of a separate annular element having the grooves therein.

17. A spinning reel comprising a frame, a spool secured to said frame, a fixed bearing, a driven shaft carried by and reciprocably and rotatably mounted in said bearing, a line pickup comprising a frontal member carried by the fore end of said shaft and provided with means for directing a line onto said spool, means for rotating said shaft and pickup, a stationary member secured to said frame in front of said pickup and provided with an opening for receiving a line adapted for connection with said spool, means carried by said stationary member, said last-mentioned means comprising an integral inwardly extending annular convex portion, an actuator carried by said frame for moving said pickup forwardly so that said frontal member may be caused to engage said convex portion of said stationary member, and said convex portion being provided with longitudinally extending straight ribs defining an annular pattern of chordally disposed grooves, the arrangement being such that a line may be received in any one of said grooves to maintain the line in a substantially straight condition therein without clamping it when said members are brought into engagement.

18. The reel defined in claim 17, in which said means carried by said stationary member is in the form of a separate annular element having the grooves therein.

References Cited by the Examiner

UNITED STATES PATENTS

| 2,613,468 | 10/1952 | Hand | 242—84.21 |
| 2,675,192 | 4/1954 | Hull | 242—84.2 |
| 2,711,292 | 6/1955 | Taggart et al. | 242—84.21 |
| 3,114,514 | 12/1963 | Clark | 242—84.21 |
| 3,128,059 | 4/1964 | Holahan | 242—84.2 |
| 3,152,771 | 10/1964 | Maury et al. | 242—84.2 |
| 3,160,363 | 12/1964 | Holahan | 242—84.2 |
| 3,185,405 | 5/1965 | Hull | 242—84.2 |

FOREIGN PATENTS 820,874   9/1959   Great Britain.

FRANK J. COHEN, *Primary Examiner.*

MERVIN STEIN, *Examiner.*

B. S. TAYLOR, *Assistant Examiner.*